United States Patent [19]

Sumida et al.

[11] Patent Number: 4,947,890

[45] Date of Patent: Aug. 14, 1990

[54] FLOW CONTROL VALVE WITH DIRT PROTECTION

[75] Inventors: Mamoru Sumida; Hironobu Fukata; Takeji Yoshida; Osamu Matsumoto, all of Himeji, Japan

[73] Assignee: Mitsubishi Denki Kabushiki Kaisha, Tokyo, Japan

[21] Appl. No.: 395,390

[22] Filed: Aug. 18, 1989

[30] Foreign Application Priority Data

Aug. 19, 1988 [JP] Japan ................................ 63-206676

[51] Int. Cl.[5] ................................................ F16K 31/06

[52] U.S. Cl. ................................ 137/546; 251/129.05; 251/129.08; 251/129.15; 123/585

[58] Field of Search ...................... 251/129.08, 129.05, 251/129.15; 137/242, 546; 123/585, 339

[56] References Cited

U.S. PATENT DOCUMENTS

| | | | |
|---|---|---|---|
| 4,339,109 | 7/1982 | Kawata et al. . | |
| 4,452,424 | 6/1984 | Kawata . | |
| 4,627,596 | 12/1986 | Busacchi | 251/129.08 X |
| 4,643,227 | 2/1987 | Suzuki et al. | 251/129.08 X |
| 4,720,078 | 1/1988 | Nakamura et al. | 251/129.15 |
| 4,817,914 | 4/1989 | Pick et al. | 251/129.15 |

FOREIGN PATENT DOCUMENTS

| | | | |
|---|---|---|---|
| 0055518 | 7/1982 | European Pat. Off. | 251/129.08 |
| 0200874 | 11/1983 | Japan | 251/129.05 |

*Primary Examiner*—Arnold Rosenthal

*Attorney, Agent, or Firm*—Sughrue, Mion, Zinn, Macpeak and Seas

[57] ABSTRACT

A flow control valve includes a hollow cylinder 32 having an open end and a fluid flow port 31 formed in its circumferential wall, a solenoid coil disposed around the cylinder, and a valve member 41 slidable within the cylinder in response to an amount of power supplied to the solenoid coil for adjusting an opening area of the fluid flow port to control the flow rate of the fluid flowing through the fluid flow port and the open end of the cylinder. A protective inner-diameter portion **32*a* formed in the open end of the cylinder is provided in association with a fluid flow path including the fluid flow port and the open end of the cylinder for preventing any foreign matters entrained in a fluid from being caught in the clearance defined between the hollow cylinder and the valve member by providing an annular clearance between the cylinder and the valve member. A reduced outer-diameter portion 44*a* axially partially extending from one end of the valve member or a dam plate 10, 11 disposed in the fluid flow path for defining a labyrinth flow path upstream of the fluid flow port may also be provided. At least a cylindrical wall 35, 36** having the fluid flow port of the hollow cylinder may be made of a molded resin.

6 Claims, 4 Drawing Sheets

FLOW CONTROL VALVE WITH DIRT PROTECTION

BACKGROUND OF THE INVENTION

This invention relates to a flow control valve and more particularly to a flow rate control valve suitable for use with a throttle valve of an internal combustion engine.

FIG. 1 illustrates a conventional flow rate control valve used as a bypass flow path of an engine. In FIG. 1, reference numeral 1 designates a throttle body defining a horizontally extending air suction passage, 2 is a throttle valve for opening or closing the passage within the throttle body 1, 3 is a valve shaft movably supporting the valve 2 and extending perpendicularly to the suction passage, 4 is a barrier wall formed in the inner lower portion of the throttle body 1, **5*a* and 5*b* are bypass passages formed in the bottom of the throttle body 1, and 5*c* is a bypass opening in communication with the bypass passage 5*b* and located at a level higher than the central axis of the throttle body 1 in an inner circumference of the cylindrical wall of the throttle body 1**.

The flow rate of the air flowing into an engine (not shown) from the air suction passage of the throttle body 1 in the direction of an arrow A is controlled at will in accordance with the opening of the throttle valve 2. The fuel is injected from the fuel injection valve in accordance with the above air flow rate to be supplied to the engine as a mixture. In order to ensure that the engine rotational speed is maintained at a target speed, a proportional solenoid valve 9 which is a flow rate control valve controls an auxiliary air flow through the bypass passages **5*a* and 5*b* including the bypass opening 5*c***.

A valve housing 15 of the proportional solenoid valve 9 is hermetically mounted to the lower portion of the throttle body 1 and comprises an air inlet **28*a* and an outlet 28*b*. The auxiliary air flows from the bypass passage 5*a* through the air inlet 28*a*, fluid flow ports 31 formed in a cylindrical wall of a hollow cylinder 32 disposed within the valve housing 15, the space within the cylinder 32, the air outlet 28*b* and through the bypass passages 5*b* and 5*c*. In order to adjust the open area of the opening of the fluid flow ports 31, a valve body 41 is slidably inserted as a movable iron core within the hollow cylinder 32. A compression spring 43 is disposed between the front end of the valve body 41 and the spring holder 6, and a compression spring 42 is mounted between the rear end of the valve body 41 and the stationary iron core 7. Around the cylinder 32, a solenoid coil 40 wound around a bobbin 8 is mounted. Reference numeral 44 designates a recess formed in the bottom of the inner circumferential surface of the throttle body 1**.

In the conventional arrangement as above described, the solenoid coil 40 is energized by an electric current in accordance with a deviation of the measured rotational speed with respect to the target rotational speed by an unillustrated electronic control circuit, so that the valve body 41 advances or retracts proportionally to the applied current value to adjust the open area of the fluid flow ports 31. Therefore, the amount of the air flow through the bypass passages **5*a* and 5*b*** is controlled so that the engine rotational speed equals to the target speed, and the amount of the fuel to be injected is also controlled accordingly.

However, when the conventional flow control valve of the above construction is used for controlling air flow in the throttle valve of an internal combustion engine, foreign matters such as carbon particles or the like entrained in the fluid flowing through the throttle accumulate on the inner surface of the cylinder 32 and the outer surface of the valve body 41 and are caught therebetween, preventing the movement of the valve body 41.

Also, since the fluid flow ports 31 are formed by punching the metallic wall of the cylinder 32, the cylinder 32 can be easily deformed when the fluid flow ports 31 are being punched, impeding a smooth movement of the valve body 41 in the cylinder 32.

SUMMARY OF THE INVENTION

Accordingly, one object of the present invention is to provide a flow control valve free from the above discussed problems of the conventional flow control valve.

Another object of the present invention is to provide a flow control valve in which any foreign matters entrained in a fluid are prevented from being caught in the clearance defined between the hollow cylinder and the valve member.

Another object of the present invention is to provide a flow control valve in which foreign matters are prevented from entering into the valve arrangement.

Another object of the present invention is to provide a flow control valve in which foreign matters are accommodated in a clearance where the foreign matters are harmless.

Still another object of the present invention is to provide a flow control valve in which the cylindrical wall having the fluid flow port of the hollow cylinder does not disadvantageously deform during manufacture.

With the above objects in view, the flow control valve of the present invention comprises a hollow cylinder having an open end and a fluid flow port formed in its circumferential wall, a solenoid coil disposed around the cylinder, and a valve member slidable within the cylinder in response to an amount of power supplied to the solenoid coil for adjusting an opening area of the fluid flow port to control the flow rate of the fluid flowing through the fluid flow port and the open end of the cylinder. A protective inner-diameter portion formed in the open end of the cylinder is provided in association with a fluid flow path including the fluid flow port and the open end of the cylinder for preventing any foreign matters entrained in a fluid from being caught in the clearance defined between the hollow cylinder and the valve member by providing an annular clearance between the cylinder and the valve member. A reduced outer-diameter portion axially partially extending from one end of the valve member or a dam plate disposed in the fluid flow path for defining a labyrinth flow path upstream of the fluid flow port may also be provided. At least a cylindrical wall having the fluid flow port of the hollow cylinder may be made of a mold resin.

BRIEF DESCRIPTION OF THE DRAWINGS

The present invention will become more readily apparent from the following detailed description of the preferred embodiments of the present invention taken in conjunction with the accompanying drawing, in which.

DESCRIPTION OF THE PREFERRED EMBODIMENTS

Figure 1:
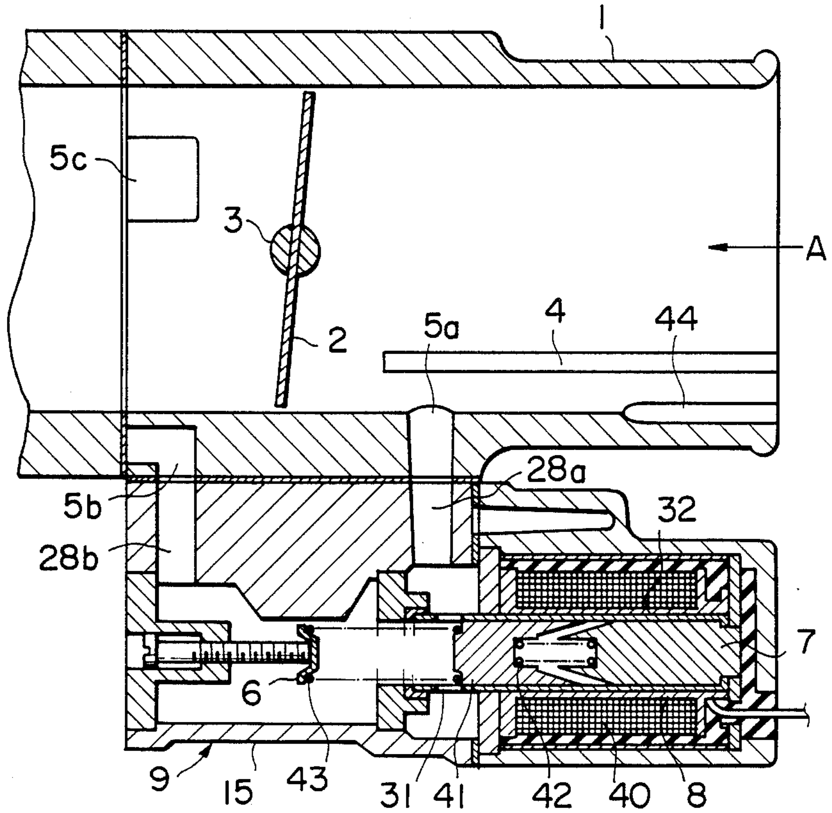
FIG. 1 PRIOR ART
FIG. 1 is a sectional view illustrating the conventional flow control valve applied to the bypass passage of an engine suction passage.
Figure 2:
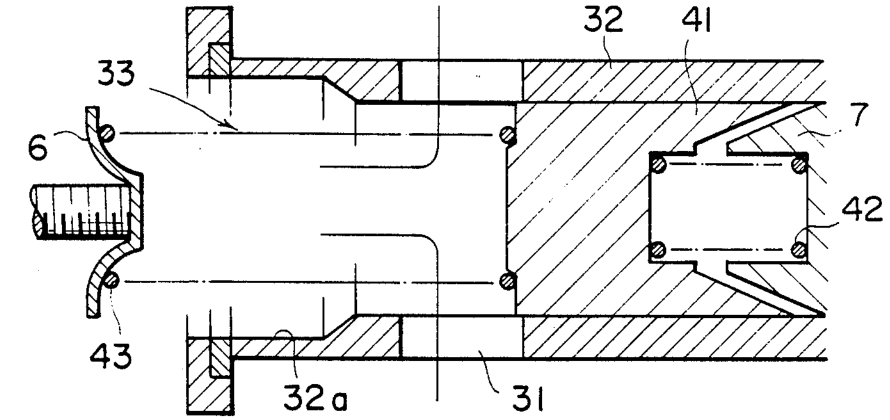
FIG. 2 is a sectional view of the flow control valve of one embodiment of the present invention.

FIG. 2 illustrates only the main components of the flow control valve of the first embodiment of the present invention. A flow control valve of the present invention comprises a hollow cylinder 32 having an open end 33 and fluid flow ports 31 formed in its cylindrical wall. Although not illustrated in FIG. 2, a solenoid coil similar to the solenoid coil 40 shown in FIG. 1 is disposed around the cylinder 32. The flow control valve also comprises a substantially cylindrical valve body 41 slidably fitted within the cylinder 32. The valve body 41 can be slidably moved along the cylinder 32 in response to the level of electrical power applied to the solenoid coil 40, so that the opening area of the fluid flow ports 31 is changed accordingly to control the flow rate of the fluid flowing through the fluid flow ports 31 and the open end 33 of the cylinder 32.

According to the present invention, the flow control valve comprises a protective arrangement disposed in association with a fluid flow path defined and including the fluid flow port 31 and the open end 33 of the cylinder 32 for preventing any foreign matters entrained in the air flowing through the bypass passages **5*a* and 5*b* from being caught in the clearance defined between the hollow cylinder 32 and the valve member 41. In the embodiment shown in FIG. 2, the protective arrangement comprises an enlarged inner-diameter portion 32*a* of the cylinder wall 32. The enlarged-inner diameter portion 32*a* is formed at the open end 33 of the cylinder 32 and axially partially extends from the open end 33 of the cylinder 32 for providing an annular clearance between the cylinder 32 and the valve member 41 for accommodating the foreign matters therein when the valve member 41 is its advanced position in which the valve body 41 is moved in the leftward position in FIG. 2 and in which the fluid flow ports 31 are closed by the outer cylindrical surface of the valve body 41**.

In other respects, the structure of the flow control valve of the invention is the same as that of the conventional design.

With the above arrangement, any foreign matters such as carbon within the fluid accumulates on the large-diameter portion **32*a* of the cylinder 32, so that the ingress of the foreign matters into the clearance between the cylinder 32 and the valve body 41 become difficult. Therefore, the foreign matter is not caught between the valve body 41 and the cylinder 32 and the sticking of the valve body 41** within the cylinder is prevented.

Even when the foreign matters have entered into the clearance between the cylinder 32 and the valve body 41, the area to which the foreign matters can attach is very small due to the provision of the enlarged-inner diameter portion **32*a*, and the probability that the valve body 41 does not properly move due to the increase of the sliding resistance by the attachment of the foreign matters is minimized. On the other hand, the movement of the valve body 41 (particularly, the movement to the outside of the normal operating range) advantageously wipes off the attached foreign matters on the cylinder 32. The foreign matters accumulated on the enlarged-inner diameter portion 32*a* are easily removed when the valve body 41 is moved beyond its normal operating range. Since the enlarged-inner diameter portion 32*a*** is formed outside of the normal range of the control operation, there is no change in flow rate characteristics.

Figure 3:
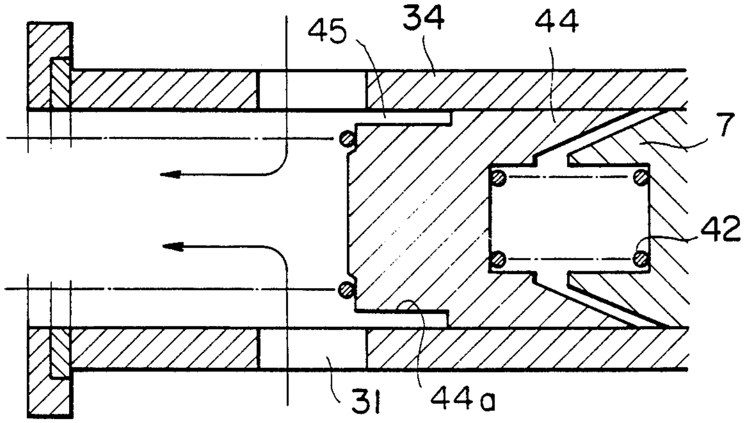
FIG. 3 is sectional view of the flow control valve of the second embodiment of the present invention.

FIG. 3 illustrates the second embodiment of the present invention in which the cylinder 34 is provided with no enlarged inner diameter portion such as the enlarged inner diameter portion **32*a* shown in FIG. 2. Instead, the front end of a valve body 44 is provided with a reduced outer-diameter portion 44*a* axially partially extending from the front end of the valve body 44 for providing an annular clearance 45 defined between the outer circumferential surface of the valve body 44 and the inner cylindrical surface of the cylinder 34 for accommodating the foreign matters therein. As in the previous embodiment, the foreign matter accumulates on the reduced diameter portion 44*a* of the valve body 44 and does not enter into the clearance between the cylinder 34 and the valve body 44, whereby the sticking of the valve body 44 to the cylinder 34 is prevented. Also, a labyrinth-shaped circumferential groove (not shown) may be formed in the reduced diameter portion 44*a* as means for receiving the accumulation of the foreign matters therein, so that the dimensional difference between the reduced diameter portion 44*a* and the valve body 44 can be decreased, thereby reducing the change in flow rate. The above embodiments are made in view of the fact that the fluid flow ports 31 must be located at a position remote by a certain distance from the open end of the cylinder 34 in order to prevent distortion of the cylinder 34 or to precisely form the fluid flow ports 31**.

Figure 4:
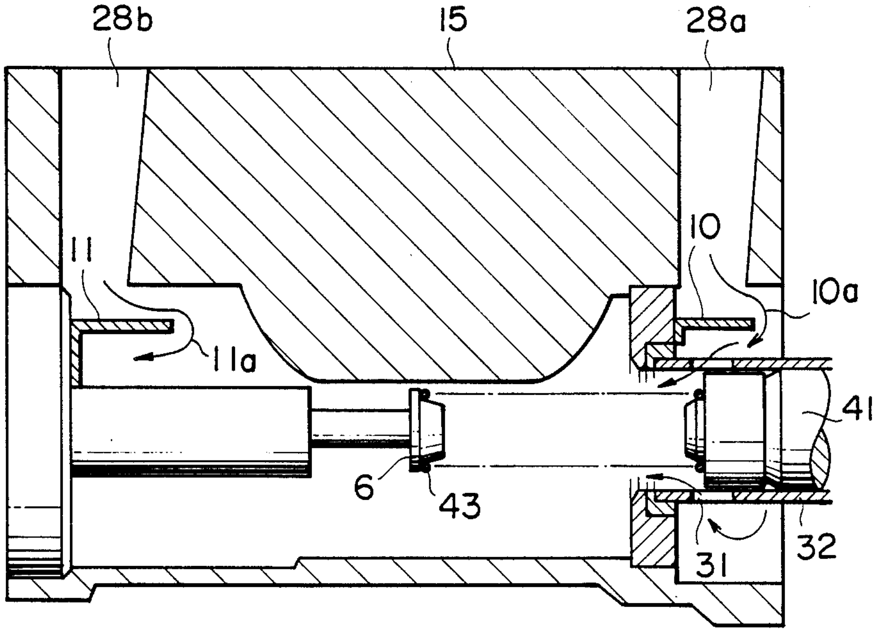
FIG. 4 is a sectional view of the flow control valve of the third embodiment of the present invention.

FIG. 4. illustrates still another embodiment of the flow control valve of the present invention in which the protective arrangement for preventing the catch of the foreign matters comprises a pair of dam plates 10 and 11 disposed in the fluid flow path for defining therein a labyrinth flow path as shown by arrows **10*a* and 11*a* upstream and downstream of the fluid flow ports 31 in the fluid flow path defined between the bypass passages 28*a* and 28*b***.

According to this arrangement, the fluid flow incoming from the bypass passage **28*a* into the fluid flow ports 31 of the cylinder 32 first impinges upon the dam plate 10 attached to the structural member of the valve arrangement and is then deflected by the dam plate 10 until it passes over the edge of the dam plate 10 as shown by the arrow 10*a* and returns back toward the fluid flow ports 31 in the cylinder 32. Thus, the fluid flow does not impinge against the valve body 41. Therefore, the fluid flow from the bypass passage 28*a* must turn its direction of movement a few times before it enters into the fluid flow ports 31, and each time the fluid changes its direction of flow, the foreign matters which may be within the incoming fluid impinge and is removed from the incoming fluid, whereby the foreign matter does not enter into the clearance between the cylinder 32 and the valve body 41 and the sticking of the valve body 41 to the cylinder 32 is prevented. The dam plate 11 mounted on the left in FIG. 4 has a function similar to the dam plate 10** on the right in the figure, but it functions as a dam against the reverse flow of the fluid from the engine.

Figure 5:
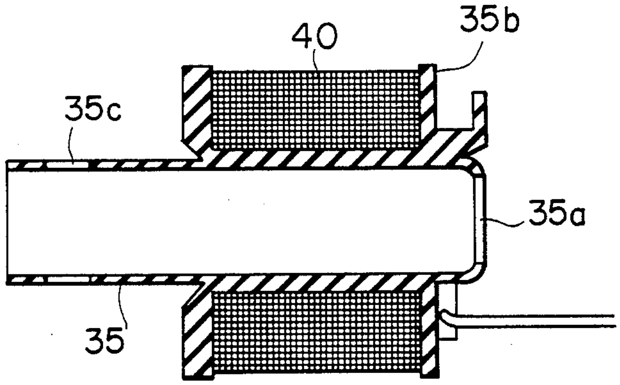
FIG. 5 is a sectional view of the cylinder of the flow control valve of the fourth embodiment of the present invention.

FIG. 5 illustrates another modification of a cylinder member 35 of the flow control valve of the present invention. The cylinder member 35 is made of a molded synthetic resin and includes a cylinder 35*a* for slidably supporting the valve body therein and a bobbin 35*b* integrally formed on the cylinder 35*a* so that the solenoid coil 40 can be wound on the bobbin 35*b*. It is seen that the cylinder 35*a* has a plurality of fluid flow ports 35*c* formed also by molding during the molding process of the cylinder 35*a* and the bobbin 35*b*.

In this embodiment, since the cylinder 35*a* and particularly the wall portion in which the fluid flow ports 35*c* are formed is made of the molded synthetic resin, the fluid flow ports 35*c* can be accurately formed without any distortion which may cause inoperativeness of the valve body within the cylinder. Also, the bobbin 35*b* and the cylinder 35*a* can be integrally and simultaneously formed by molding, making the manufacture simple and easy.

Figure 6:
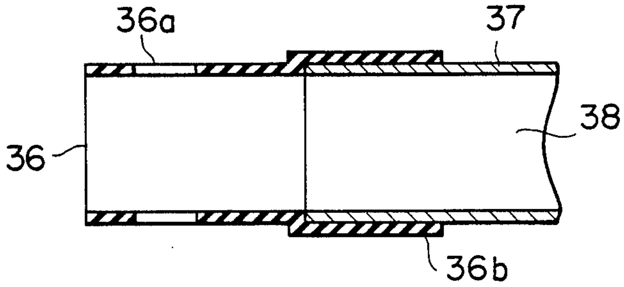
FIG. 6 is a sectional view of the cylinder of the flow control valve of the fifth embodiment of the present invention.

FIG. 6 illustrates another embodiment of a hollow cylinder 38 for slidably supporting the valve body 41 in which only a cylindrical wall 36 having fluid flow ports 36*a* is made of a molded resin. The cylindrical wall 36 made of the molded resin is attached by press-fit at a joint 36*b* to a metallic cylinder main body 37.

As has been described, according to the present invention, the flow control valve of the present invention comprises a hollow cylinder having an open end and a fluid flow port formed in its circumferential wall, a solenoid coil disposed around the cylinder, and a valve member slidable within the cylinder in response to an amount of power supplied to the solenoid coil for adjusting an opening area of the fluid flow port to control the flow rate of the fluid flowing through the fluid flow port and the open end of the cylinder. A protective inner-diameter portion formed in the open end of the cylinder is provided in association with a fluid flow path including the fluid flow port and the open end of the cylinder for preventing any foreign matters entrained in a fluid from being caught in the clearance defined between the hollow cylinder and the valve member by providing an annular clearance between the cylinder and the valve member. Accordingly, any foreign matters entrained in a fluid are prevented from being caught in the clearance defined between the hollow cylinder and the valve member, and the foreign matters are prevented from entering into the valve arrangement or the foreign matters are accommodated in a clearance where the foreign matters are harmless. Also, since at least a cylindrical wall having the fluid flow ports of the hollow cylinder may be made of a molded resin, that portion of the cylindrical wall does not disadvantageously deform during manufacture and impede smooth movement of the valve body therein.

What is claimed is:

1. A combustion air flow control valve for a throttle bypass passage of an internal combustion engine, comprising:

a hollow cylinder (32; 34; 35) having an open end (33) and an air flow port (31; 35*c*) formed in a circumferential wall thereof;

a solenoid coil (40) disposed around said cylinder; a valve member (41; 44) slidable within said cylinder in response to an amount of power supplied to said solenoid coil for adjusting an opening area of said air flow port to control the flow rate of air flowing through said air flow port and said open end of said cylinder; and protective means disposed in association with an air flow path including said air flow port and said open end of said cylinder for preventing any foreign matter entrained in the air flow from becoming lodged in a clearance defined between said hollow cylinder and said valve member, and attendantly impeding the sliding movement of the valve member.

2. A flow control valve as claimed in claim 1, wherein said protective means comprises an enlarged inner-diameter portion (32*a*) axially partially extending from said open end of said cylinder for providing an annular clearance between said cylinder and said valve member for accommodating foreign matter therein.

3. A flow control valve as claimed in claim 1, wherein said protective means comprises a reduced outer-diameter portion (44*a*) axially partially extending from one end of said valve member for providing an annular clearance between said cylinder and said valve member for accommodating foreign matter therein.

4. A flow control valve as claimed in claim 1, wherein said protective means comprises a dam plate (10) disposed in said fluid flow path for defining a labyrinth flow path upstream of said fluid flow port.

5. A flow control valve as claimed in claim 1, wherein said protective means comprises dam plates (10, 11) disposed in said fluid flow path for defining a labyrinth flow path upstream of said fluid flow port and a labyrinth flow path downstream of said open end of said hollow cylinder.

6. A flow control valve as claimed in claim 1, wherein at least a cylindrical wall having said fluid flow port of said hollow cylinder is made of a molded resin.

* * * * *